United States Patent [19]

McCloskey

[11] 3,907,384

[45] Sept. 23, 1975

[54] ANTI-FRICTION BALL BEARING ASSEMBLY

[75] Inventor: Albert R. McCloskey, Fairfield, Conn.

[73] Assignee: Rockwell International Corporation, Pittsburgh, Pa.

[22] Filed: Oct. 10, 1973

[21] Appl. No.: 405,034

[52] U.S. Cl. ................................. 308/6 C; 64/23.7
[51] Int. Cl.² ........................................ F16C 29/12
[58] Field of Search ...................... 308/6 C; 64/23.7

[56] References Cited
UNITED STATES PATENTS
2,620,163  12/1952  Stone ................................. 308/6 C FOREIGN PATENTS OR APPLICATIONS
630,650  4/1963  Belgium ............................. 308/6 C
235,561  9/1964  Germany ............................ 308/6 C Primary Examiner—Evon C. Blunk
Assistant Examiner—Robert Saifer

[57] ABSTRACT

An anti-friction ball bearing assembly, adapted for mounting within a housing comprising an outer sleeve and an inner sleeve concentrically fitting within the outer sleeve, the inner sleeve having a central opening for the passage of a shaft therethrough, the inner sleeve having a number of tracks defining paths for the circulation of balls between the sleeves and the shaft during movement between the shaft and the bearing assembly, the balls, during a portion of their circulation path, contacting the shaft and the inner surface of the outer sleeve at a plurality of raceway surfaces provided thereon, the outer sleeve having on its outer surface at least one annular groove, an "O" ring disposed in the annular groove and in contact with the inner surface of the housing to accommodate misalignment between the housing and the shaft.

7 Claims, 3 Drawing Figures

ANTI-FRICTION BALL BEARING ASSEMBLY

BACKGROUND OF THE INVENTION

This invention relates to a ball bearing assembly adapted to move longitudinally along a circular shaft. In particular, the invention relates to a anti-friction ball bearing assembly, adapted for mounting within a housing comprising an outer sleeve and an inner sleeve concentrically fitting within said outer sleeve, said inner sleeve having a central opening for the passage of a shaft therethrough, said inner sleeve having a number of tracks defining paths for the circulation of balls between said sleeves and said shaft during movement between said shaft and said bearing assembly, said balls, during a portion of their circulation path, contacting said shaft and the inner surface of said outer sleeve at a plurality of raceway surfaces provided thereon, said outer sleeve having on its outer surface at least one annular groove, an "0" ring disposed in said annular groove and in contact with the inner surface of said housing to accommodate misalignment between said housing and said shaft.

The prior art is replete with recirculating ball bearing assemblies. Typical prior art forms of bearings of this type are subject to high rates of wear between their respective parts.

One of the primary causes of premature wear in linear ball bearing assemblies can be directly related to misalignment of the shaft with respect to the housing in which the linear bearing is placed. A small degree of misalignment will cause binding of the shaft with respect to the various recirculating balls, and this binding will cause scoring, pitting and fatigueing of the balls, the shaft and the various raceway surfaces upon which the balls are supported in their loaded state.

The prior art has attempted to accommodate this misalignment by utilizing intricate and expensive designs which are at best only marginally successful.

SUMMARY OF THE INVENTION

Accordingly, it is a primary object of this invention to provide an anti-friction ball bearing assembly, adapted for mounting within a standard housing comprising an outer sleeve and an inner sleeve concentrically fitting within said outer sleeve, a shaft therethrough, said inner sleeve having a number of tracks defining paths for the circulation of balls between said sleeves and said shaft during movement between said shaft and said bearing assembly, said balls, during a portion of their circulation path, contacting said shaft and the inner surface of said outer sleeve at a plurality of raceway surfaces provided thereon, said outer sleeve having on its outer surface at least one annular groove, an 0 ring disposed in said annular groove and in contact with the inner surface of said housing to accommodate misalignment between said housing and said shaft.

It is another object of this invention to provide an anti-friction ball bearing assembly which is particularly adapted to accommodate mechanical misalignment of the shaft with respect to the housing in which the bearing is mounted, the mechanical misalignment being of the type that is primarily caused by mounting and fabrication inaccuracies in the overall bearing system.

It is still another object of the present invention to provide a highly efficient ball bearing assembly which is capable of being inexpensively manufactured and being simplistic in design.

It is still another object of the present invention to provide an anti-friction ball bearing assembly which can be used with "standard catalog housings", therefore obviating the need for extra and external accessories.

It is still another object of the present invention to provide an anti-friction ball bearing assembly which can be manufactured using high volume automated techniques.

It is yet another object of the present invention to provide an anti-friction ball bearing assembly which can accommodate certain dynamic misalignments.

Other objects of the present invention and details of the structure of the anti-friction ball bearing assembly will appear more fully from the following description and accompanying drawings.

DETAIL DESCRIPTION OF THE INVENTION

Figure 1:
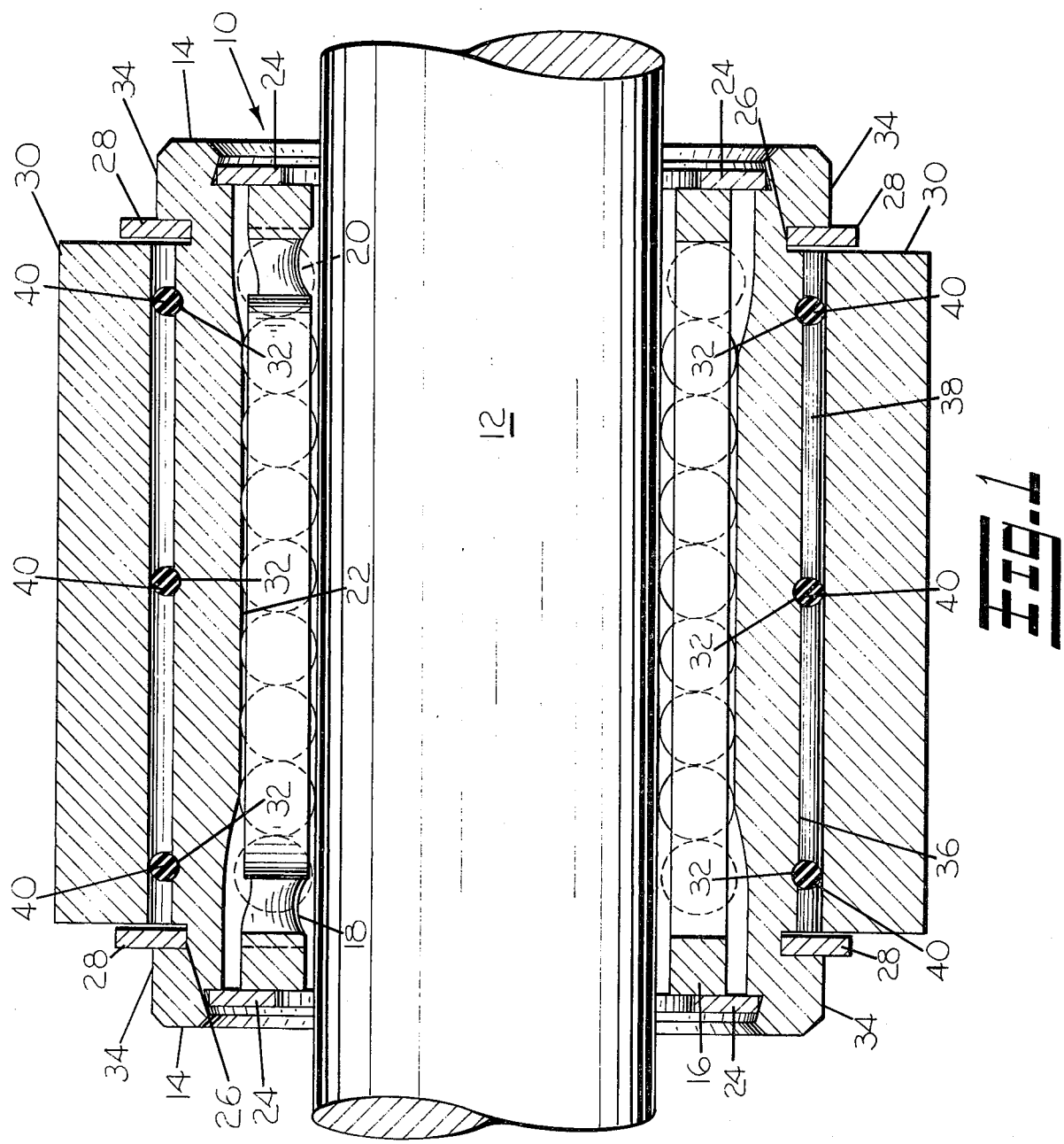
FIG. 1 is a side elevational view partially cut away of an anti-friction ball bearing assembly mounted on a shaft embodying the concept of the present invention.

Referring now to the drawing, that is FIG. 1, there is shown an improved anti-friction ball bearing assembly embodying the concept of the present invention wherein the anti-friction ball bearing assembly is generally designated by the numeral 10. The anti-friction ball bearing assembly 10 is particularly adapted for being mounted, for linear translation thereon, on a shaft 12. The anti-friction ball bearing assembly 10 is provided with an outer sleeve 14 and an inner sleeve 16. The outer surface of the inner sleeve 16 may be polyhedronal in shape and may have a number of axially extending planar surfaces (not shown).

The inner sleeve 16 is further provided with a number of closed loop tracks 18 which define paths with circulation of load carrying balls 20. The inner surface of the outer sleeve 14 may also be polyhedronal in shape. The inner surface of the outer sleeve 14 has a number of axially extending planar surfaces. The shape of the inner surface of the outer sleeve 14 generally conforms to the shape of the outer surface of the inner sleeve 16. The outer surface of the inner sleeve 16 therefore may be placed in registration with the inner surface of the outer sleeve at their respective axially extending planar surfaces.

A plurality of axially extending bearing raceways 22 are provided on the inner surface of the outer sleeve 14.

The retaining means such as snap rings 24 are provided at each end of the anti-friction ball bearing assembly 10 to positionally anchor the inner sleeve 16 in the outer sleeve 14 to thereby maintain the operational integrity of the anti-frictional ball bearing assembly 10. The snap rings 24 therefor maintain the axial position of the inner sleeve 16 with respect to the outer sleeve 14 while the aforementioned registration of the axially extending planar surfaces of the inner sleeve 16 and the outer sleeve 14 maintain the radial position of the inner sleeve 16 with respect to the outer sleeve 14.

The outer surface of the outer sleeve 14 generally embodies and contains the critical departure from the prior art forms of linear bearings. It can be seen from FIG. 1 that the outer surfaces is in reality a number of different surfaces each performing certain complimentary functions.

The outer surface of the outer sleeve 14 is provided with annular grooves 26. These annular grooves 26 are adapted to receive retaining means such as snap rings 28.

The snap rings 28 axially position the anti-friction ball bearing assembly 10 within housing 30. The snap rings 28 may be so positioned in their annular grooves on the outer surface of the outer sleeve so as to provide a small space between them and the housing 30. This gap or space will provide a degree of play between the housing 30 and the outer sleeve 34. The housing 30 which is substantially cylindrical in shape is the means by which the anti-friction ball bearing assembly 10 is operationally connected to a machine element device, apparatus or the like such as a tooling fixture, etc. (not shown). The housing 30 (or sometimes referred to as a bushing) is attached to such machine element, etc., by an appropriate attaching means (not shown) such as a set screw, press fit or the like. A typical example of housings 30 can be found in ROCKWELL INTERNATIONAL CORPORATION'S catalog LB-2. These products are marketed under Rockwell International Corporation's trademark UNILIN.

The outer surface of the outer sleeve 14 is also provided with at least one annular grooves 32. As shown in FIG. 1 the outer surface of the outer sleeve 14 is provided with three, substantially equal spaced, annular grooves 32 one groove on each end thereof and one groove in the middle. The annular grooves 32 are formed to accommodate 0 rings 40. Again, as shown in FIG. 1 there are three 0 rings 40, one disposed in each annular groove 32. It can be seen that the 0 rings effect the mechanical interface between the outer surface of the outer sleeve 14 and the inner surface of the housing 30. The snap rings 28 as before mentioned are so positioned with respect to the ends of the housing 30 so as to provide a degree of play.

It should be added that a number of 0 rings could be placed in a single groove. That is to say the annular groove 32 could be so formed as to accommodate more than one 0 ring therein. Typically in this type of configuration there would be a single annular groove disposed centrally on the outer surface of outer sleeve 14, the single annular groove having a multiplicity of 0 rings disposed therein.

It can be seen that the sizing of the 0 rings 40 and the density of the material, such as a suitable plastic or rubber material, of the 0 rings 40 will determine the tightness of fit of the linear bearing 10 within the housing 30. Accordingly, a preselected degree of preloading force can be effected by the 0 rings at the mechanical interface between the housing 30 and the outer sleeve 14 of the linear bearing 10. It can be further seen that the 0 rings 40 disposed within the annular grooves 32 enables the housing 30 to move or become misaligned with respect to the anti-friction ball bearing assembly 10 and the shaft 12 and vice versa. That is, if one operative mechanism, e.g. the housing 30, becomes misaligned with respect to another operative mechanism, e.g. the shaft 12, this misalignment will be accommodated by the 0 rings which will give by means of deformation thereby relieving the various moving parts of the overall assembly of any misalignment forces.

The inner surface of the housing 30 is typically cylindrical in shape and has a diameter substantially equal to, or slightly larger, than the original outside diameter of the outer surface 34 of the outer sleeve 14.

The outer surface 34 of the outer sleeve 14 may be generated in two fashions. That is to say the area of the outer surface of the outer sleeve 34 in registration with the inner surface of the housing 30 may be undercut so as to provide a space in which the 0 rings 40 may operate. However, it may also be added that the entire outer surface of the outer sleeve 14 may be generally undersized with respect to the inner surface of the housing 30.

The misalignment that is typically encountered is static misalignment, that is, misalignment built into the system as for example that misalignment which may be caused by an improperly aligned shaft. The action of the 0 rings 40 will also accommodate certain degrees of dynamic misalignment such as may be caused by different loading vectors.

It should be noted that the accommodation of static and dynamic misalignment forces is achieved by the present invention without any special accessories, parts or the like and utilizes off-the-shelf components such as standard housings 30, 0 rings and the like.

Figure 2:
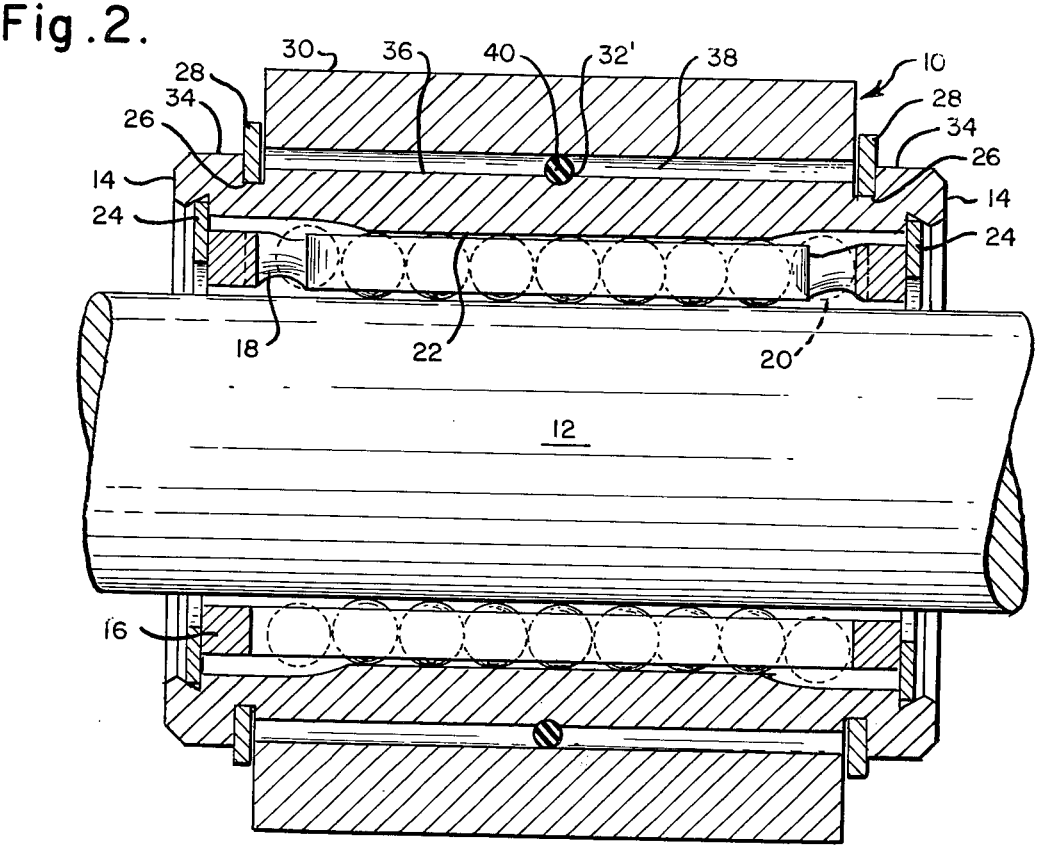
FIG. 2 is a side elevational view partially cut away of an anti-friction ball bearing assembly mounted on a shaft embodying another form of the present invention.
Figure 3:
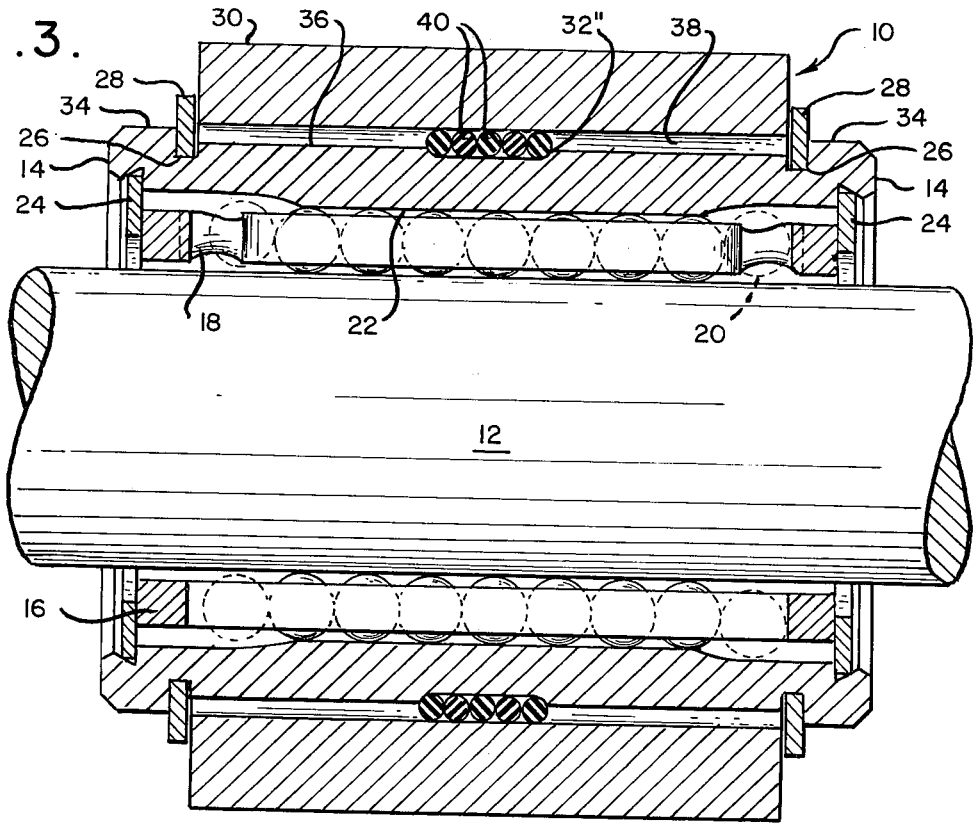
FIG. 3 is a side elevational view partially cut away of an anti-friction ball bearing assembly mounted on a shaft embodying yet another form of the present invention.

FIG. 1 shows three annular grooves 32 and three 0 rings 40 disposed in the annular grooves. The 0 rings 40 are spaced on the outer surface of the outer sleeve 14. It should be noted that various combinations of spacings of the annular grooves and 0 rings could be used to achieve the objectives of the present invention. For example a single 32 annular groove and a single 0 ring 40 disposed in said annular groove could be placed at the midpoint of the outer surface of the inner sleeve 14. FIG. 2 shows such a configuration and FIG. 3 shows more than one 0 ring 40 disposed in the annular groove 32. Similarly two 0 rings 40 and complimentary annular grooves could be disposed a distance from the ends of the inner sleeve 14 on its outer surface. Further, and as before mentioned the 0 rings 40 can be so sized as to effect a preloading force at the mechanical interface of the housing 30 and inner sleeve 14. The degree of preloading as well as the number of 0 rings will depend upon the particular application to which the linear bearing 10 is to be placed. In certain applications a high degree of preloading and attendant increase in rigidity of the structure may be desired. Similarly certain applications may demand a highly flexible interface between the linear bearing 10 and its housing 30.

It is therefore, obvious, that the present invention is not to be limited to the specific details as herein described, but is capable of other modifications and changes without departing from the spirit and scope of the appended claims.

I claim:

1. An anti-friction ball bearing assembly, adapted for mounting within a housing comprising an outer sleeve and an inner sleeve concentrically fitting within said outer sleeve, said inner sleeve having a central opening for the passage of a shaft therethrough, said inner sleeve having a number of tracks defining paths for the circulation of balls between said sleeves and said shaft during movement between said shaft and said bearing assembly, said balls, during a portion of their circulation path, contacting said shaft and the inner surface of said outer sleeve at a plurality of raceway surfaces provided thereon, said outer sleeve having on its outer surface at least one annular groove, at least one 0 ring disposed in said annular groove and in contact with the inner surface of said housing to accommodate misalignment between said housing and said shaft.

2. An anti-friction ball bearing assembly in accordance with claim 1 in which there are three annular grooves on said outer surface of said outer sleeve and three 0 rings disposed in each of said annular grooves.

3. Anti-friction ball bearing assembly in accordance with claim 1 in which said 0 ring is in a preloaded state between the inner surface of said housing and the outer surface of said outer surface.

4. An anti-friction ball bearing assembly in accordance with claim 1 in which there is a single annular groove with an 0 ring disposed therein positioned at the midpoint between the ends of said outer sleeve.

5. An anti-friction ball bearing assembly in accordance with claim 1 in which one 0 ring is disposed in each annular groove.

6. An anti-friction ball bearing assembly in accordance with claim 1 in which more than one 0 rings are disposed in a single annular groove.

7. An anti-friction ball bearing assembly in accordance with claim 6 in which said single annular groove is disposed centrally on the outer surface of the outer sleeve.

* * * * *